US012650544B2

(12) United States Patent
Winter et al.

(10) Patent No.: US 12,650,544 B2
(45) Date of Patent: Jun. 9, 2026

(54) METHOD FOR PRODUCING AN OPTICAL ELEMENT

(71) Applicant: Carl Zeiss SMT GmbH, Oberkochen (DE)

(72) Inventors: Ralf Winter, Schwaebisch Gmuend (DE); Vitaly Shklover, Heidenheim (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 637 days.

(21) Appl. No.: 17/985,383

(22) Filed: Nov. 11, 2022

(65) Prior Publication Data

US 2023/0075759 A1     Mar. 9, 2023

Related U.S. Application Data

(63) Continuation of application No. PCT/EP2021/062304, filed on May 10, 2021.

(30) Foreign Application Priority Data

May 14, 2020    (DE) ..................... 10 2020 206 107.6

(51) Int. Cl.
G02B 5/18       (2006.01)
G02B 5/08       (2006.01)
G02B 5/10       (2006.01)

(52) U.S. Cl.
CPC ......... G02B 5/1814 (2013.01); G02B 5/0891 (2013.01); G02B 5/10 (2013.01); G02B 5/1857 (2013.01); G02B 5/1876 (2013.01)

(58) Field of Classification Search
CPC ... G02B 5/10; G02B 5/08; G02B 5/18; G02B 5/1814; G02B 5/0891; G02B 5/1857;
(Continued)

(56) References Cited

U.S. PATENT DOCUMENTS 3,738,835 A      6/1973  Bakos
5,318,928 A *    6/1994  Gegenwart ....... H01L 21/02301
257/E21.279
(Continued)

FOREIGN PATENT DOCUMENTS

DE          10258094 A1     7/2004
DE      102016205893 A1    10/2017
(Continued)

OTHER PUBLICATIONS

English translation of DE102019200698 (Year: 2019).*
(Continued)

*Primary Examiner* — Jie Lei
(74) *Attorney, Agent, or Firm* — Edell, Shapiro & Finnan, LLC

(57)         ABSTRACT

An optical element (11) has an optical surface (20) with a diffraction structure (21). The optical surface (20) is curved such that a distance-to-diameter ratio between a distance A between a deepest point (T) and a highest point (H) and a largest diameter D is greater than 1/10. When producing the optical element (11), firstly a raw optical element having a raw optical surface to be provided with the diffraction structure (21) is provided. The raw optical surface is then coated with a photoresist with the aid of an isotropic deposition method and the photoresist is exposed and then developed. This results in a production method for an optical element with an optical surface having a diffraction structure, which method satisfies stringent requirements made of a structure accuracy when producing the diffraction structure.

20 Claims, 6 Drawing Sheets

(58) Field of Classification Search
 CPC .. G02B 5/1876; G02B 5/1838; G02B 5/1861;
  G02B 5/32; G02B 5/203; G02B 19/0023;
  G02B 19/0047; G02B 19/0095; G03F
  7/70; G03F 7/00; G03F 7/70033; G03F
  7/70175; G03F 7/70575; G03F 7/70158
 USPC ....... 359/558, 572, 576, 359, 355, 350, 863,
  359/869, 867; 250/493.1, 494.1, 504 R
 See application file for complete search history.

(56) References Cited

U.S. PATENT DOCUMENTS

| | | |
|---|---|---|
| 6,352,747 B1 | 3/2002 | Blackburn et al. |
| 6,859,515 B2 | 2/2005 | Schultz et al. |
| 9,541,658 B2 | 1/2017 | Sherrill |
| 9,541,685 B2 | 1/2017 | Kierey et al. |
| 9,640,291 B2 | 5/2017 | Feser et al. |
| 2004/0166670 A1 | 8/2004 | Brintzinger et al. |
| 2012/0121932 A1 | 5/2012 | George et al. |
| 2012/0188522 A1 | 7/2012 | Silova |
| 2016/0086681 A1 | 3/2016 | Leung et al. |

FOREIGN PATENT DOCUMENTS

| | | |
|---|---|---|
| DE | 102016209359 A1 | 11/2017 |
| DE | 102017221746 A1 | 9/2018 |
| DE | 102019200698 A1 | 12/2019 |
| DE | 102019214243 A1 | 5/2020 |
| EP | 0176356 B1 | 11/1988 |
| JP | H08146209 A | 6/1996 |
| JP | 2000035500 A | 2/2000 |
| JP | 2012156506 A | 8/2012 |
| JP | 2012182492 A | 9/2012 |
| JP | 2014514737 A | 6/2014 |
| JP | 2015-523 714 A | 8/2015 |
| WO | 2012123436 A1 | 9/2012 |
| WO | 2013174656 A1 | 9/2012 |

OTHER PUBLICATIONS

International Search Report, PCT/EP2021/062304, Jul. 29, 2021, 5 pages.

Eckstein et al., "High dynamic grayscale lithography with an LED-based micro-image stepper", SPIE Advanced Lithography, Mar. 2016, 8 pages.

German Office Action with English translation, Application No. 10 2020 206 107.6, Nov. 30, 2020, 11 pages.

O'Shea et al., "Gray-scale masks for diffractive-optics fabrication: II. Spatially filtered halftone screens", Applied Optics, vol. 34, No. 32, Nov. 10, 1995, 9 pages.

Pham et al., "Spray coating of photoresist for pattern transfer on high topography surfaces", Institute of Physics Publishing, (Feb. 2005), pp. 691-697.

Xie et al., "Fabrication of large diffractive optical elements in thick film on a concave lens surface", Optics Express, May 5, 2003, vol. 11, No. 9, 4 pages.

Li et al., "Towards a portable Raman spectrometer using a concave grating and a time-gated CMOS SPAD", Optics Express, Jul. 2014, vol. 22, No. 15, 12 pages.

Mizutani et al., "Two-spherical-wave ultraviolet interferometer for making an antireflective subwavelength periodic pattern on a curved surface", Applied Optics, vol. 49, No. 32, Nov. 10, 2010, 8 pages.

Reimer et al., "Micro-optic fabrication using one-level gray-tone lithography", Proc. SPIE vol. 3008, Apr. 1997, 11 pages.

Stilson et al., "Fabrication of 3D Surface Structures Using Grayscale Lithography", Electrical and Computer Engineering Faculty Research and Publications/College of Engineering, Proceedings of SPIE 8973, (Mar. 2014), 11 pages.

Zhou Han et al., "Molecular Layer Depositon of Functional Thin Films for Advanced Lithographic Patterning", Applied Materials & Interfaces, (Feb. 2011), 7 pages.

Suleski et al., "Gray-scale masks for diffractive-optics fabrication: I. Commerical slide imagers", Applied Optics, vol. 34, No. 32, Nov. 10, 1995, 11 pages.

Grushina, "Direct-write grayscale lithography", Adv. Opt. Techn. May 2019; 8 (3-4): pp. 163-169.

Yu et al., "Spray Coating of Photoresist for 3D Microstructures with Different Geometries", Journal of Physics: Conference Series 34, (Jan. 2006), 7 pages.

Weichelt et al., "Photomask displacement technology for continuous profile generation by mask aligner lithography", Journal of Optics 18 (Nov. 2016) 5 pages.

Weichelt et al., "Mask aligner lithography using laser illumination for versatile pattern generation", Optics Express, vol. 25, No. 18, Sep. 4, 2017, 10 pages.

Japanese Office Action with English translation, Application No. 2022-568968, Jan. 21, 2025, 12 pages.

European Office Action with English translation, Application No. 21 726 581.8, Apr. 2, 2025, 14 pages.

* cited by examiner

METHOD FOR PRODUCING AN OPTICAL ELEMENT

CROSS REFERENCE TO RELATED APPLICATIONS

This is a Continuation of International Application PCT/EP2021/062304 which has an international filing date May 10, 2021, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2020 206 107.6 filed on May 14, 2020.

FIELD OF INVENTION

The invention relates to a method for producing an optical element with an optical surface having a diffraction structure. Furthermore, the invention relates to an optical element, produced by such a method, an illumination system comprising such an optical element, a projection exposure apparatus comprising such an illumination system, a method for producing a micro- or nanostructured component with the aid of such a projection exposure apparatus, and a micro- or nanostructured component produced through such a method.

BACKGROUND

One example of an optical element with an optical surface curved such that a distance-to-diameter ratio between a distance, measured along an averaged surface normal, between a deepest point and a highest point on the optical surface and a largest diameter is greater than 1/10 is a collector for extreme ultraviolet (EUV) beams as part of an illumination system of an EUV projection exposure apparatus. One example of such a collector is known to a person skilled in the art from U.S. Pat. No. 9,541,685 B2. A reflection surface of the collector therein is produced with the aid of a diamond turning method.

U.S. Pat. No. 6,352,747 B1 discloses a method for coating curved surfaces using spray coating. Such a method can be used, in principle, for applying a photoresist for producing diffraction structures on optical surfaces. Insofar as diffraction structures have to be produced with stringent requirements made of a structure accuracy, however, the spray coating method encounters inherent limitations.

Reference should furthermore be made to the following prior art:

Mitzutani, A. et al.: "Two-spherical-wave ultraviolet interferometer for making an anti-reflective subwavelength periodic pattern on a curved surface", APPLIED OPTICS Vol. 49, No. 32, pages 6268-6275 (2010);

Eckstein, H.-C. et al.: "High dynamic grayscale lithography with an LED-based micro-image stepper", Proc. Of SPIE Vol. 9780, pages 97800T-1 to 97800T-7 (2016);

Li, Z. et al.: "Towards a portable Raman spectrometer using a concave grating and a time-gated CMOS SPAD", OPTICS EXPRESS Vol. 22, No. 15, pages 18736-18747 (2014);

Xie, Y. et al.: "Fabrication of large diffractive optical elements in thick film on a concave lens surface", OPTICS EXPRESS Vol. 11, No. 9, pages 992-995 (2003);

JP H08-146 209 A;

DE 10 2016 209 359 A1;

DE 10 2017 221 746 A1;

DE 10 2019 214 243 A1.

SUMMARY

It is an object of the present invention to provide a production method for an optical element with an optical surface having a diffraction structure such that the method satisfies stringent requirements in terms of a structure accuracy when the diffraction structure is produced.

This object is achieved according to one formulation of the invention with a production method having the features specified in Claim 1. When producing the optical element, firstly a raw optical element having a raw optical surface to be provided with the diffraction structure is provided. The raw optical surface is then coated with a photoresist with the aid of an isotropic deposition method. Thereafter, the photoresist is exposed and then developed.

In the case of the optical element produced, a distance-to-diameter ratio A/D can be greater than 1/8, can be greater than 1/5, can be greater than 1/4, can be greater than 1/2 and can also be greater than 1/1. An upper limit for the distance-to-diameter ratio A/D can be 1/1. The averaged surface normal is the direction average value, averaged over the directions of all normals to surface portions of the optical surface. In the case of a rotationally symmetrical optical surface having a boundary surface that is likewise rotationally symmetrical with respect to the axis of rotational symmetry, the direction of the averaged surface normal corresponds to the direction of the axis of rotational symmetry.

The optical surface of the optical element can be a reflection surface. Alternatively, the optical surface can also be a refractive surface. A raw distance-to-diameter ratio of the raw optical surface can deviate from the distance-to-diameter ratio A/D of the optical surface to be produced by not more than 10%. With regard to its convex/concave curvature, the raw optical surface can have a basic curvature corresponding to that of the optical surface of the element to be produced.

Before the raw optical surface is coated with the photoresist, the basic body of the raw optical surface can be coated with a structurable layer, into which the diffraction structure is then introduced. Firstly, coating the basic body with the structurable layer and, secondly, developing the photoresist are known from the prior art. With regard to these steps, which do not differ, in principle, from spray coating as prior art that uses a photoresist coating step, reference is made to the specialist article "Spraycoating of photoresist for pattern transfer on high topography surfaces" by Pham et al., J. Micromech. Microeng. 15 (2005) 691 to 697, and to the specialist article "Spraycoating of photoresist for 3D microstructures with different geometries" by Yu et al. Journal of Physics: Conference Series 34 (2006) 937 to 942.

Developing the photoresist can be followed by removing photoresist residues. Coating with the photoresist and developing the photoresist can also be carried out repeatedly one after another during the production method. After the diffraction structure has been produced, it can be sealed with a sealing layer, as is likewise known from the prior art.

The isotropic deposition method ensures a conformal, homogeneous coating of the raw optical surface with the photoresist. Structures already present in the raw optical element are then not smeared out or blurred during coating, but rather are also maintained in the photoresist. The isotropic, homogeneous coating additionally ensures that regions that are difficult to access or inaccessible using the directional coating method according to the prior art are likewise coated with the photoresist in a desired manner. Insofar as is desirable during a subsequent photoresist coating step, structure sidewalls of the optical diffraction structure that have already been produced in a preceding step can then also be coated with the photoresist isotropically with a desired layer thickness. This is possible even when the structure sidewalls already present have high sidewall steepnesses. The isotropic deposition method is independent of gravitation, in particular.

An applied layer thickness according to Claim 2 has proved to be worthwhile in practice. An absolute applied layer thickness of the photoresist can be in the range of between 5 μm and 15 μm, can be in the range of between 6 μm and 12 μm and can be in the range of between 8 μm and 10 μm. Said layer thickness can be in particular 8 μm, 9 μm and 10 μm.

A thickness variation of the photoresist applied through the isotropic deposition method according to Claim 3 enables the photoresist subsequently to be developed in a very defined manner independently of photoresist thickness effects. The thickness variation, i.e. the difference between a maximum and a minimum photoresist thickness over a predefined portion of the predefined surface, in particular over the entire optical surface on which the diffraction structures are intended to be applied, can be less than 15%, can be less than 10% and can also be less than 5%. The thickness variation is regularly greater than 1%. An absolute thickness variation of the applied photoresist can be less than 2 μm This applies in particular to absolute photoresist thicknesses which are greater than 10 μm. The thickness variation can even be significantly less than 2 μm, can be less than 1.5 μm, can be less than 1.0 μm, can be less than 0.7 μm, can be less than 0.5 μm and can be 0.4 μm, for example.

Photoresist coating with electrophoretic deposition according to Claim 4 has proved to be worthwhile in practice. Electrophoretic deposition is known, e.g., from U.S. Pat. No. 3,738,835 and DE 10 258 094 A1.

Molecular layer deposition for photoresist coating has also proved to be worthwhile when producing the diffraction structures of the optical element. Molecular layer deposition is known, e.g., from US 2012/0121932 A1.

The advantages of an optical element according to Claim 6 correspond to those which have already been explained above with reference to the production method.

The optical diffraction structure produced can be a multiperiodic diffraction structure, a binary diffraction structure, a ternary diffraction structure and a diffraction structure having more than three steps or structure levels. The number of periods of a multi-periodic diffraction structure produced by the production method can be greater than or equal to 2. The optical diffraction structure produced can alternatively or additionally be a Fresnel lens, a two- or multidimensional grating and a computer-generated hologram (CGH).

The advantages of the production method are particularly pronounced in the case of an EUV collector according to Claim 7. The optical diffraction structure can be used there in particular for extraneous light suppression. This prevents extraneous light that is undesirably concomitantly guided with the EUV used illumination light from impinging on downstream optical components of a projection exposure apparatus that are intended to guide the used light.

The advantages of the production method are particularly pronounced in the case of a diameter of the optical surface according to Claim 8. The diameter can be greater than 150 mm, can be greater than 200 mm, can be greater than 250 mm, can be greater than 300 mm, can be greater than 500 mm, can be greater than 2 m and can also be greater than 5 m. An upper limit for the diameter can be 10 m.

A sidewall steepness according to Claim 9 has turned out to be advantageous for attaining a desired diffraction result. The sidewall steepness can be greater than 20°, can be greater than 30°, can be greater than 40°, can be greater than 50°, can be greater than 60°, can be greater than 70°, can be greater than 80° and can also be greater than 90°, such that diffraction structures can arise whose structure profiles taper toward a structure base. An upper limit for the sidewall steepness can be 110° or else 100°. A preferred sidewall steepness is in the region of 90°. Smaller sidewall steepnesses can be used in particular for producing blazed optical diffraction grating structures, i.e. for producing blazed diffraction gratings.

An embodiment of the diffraction structures according to Claim 10 has proved to be worthwhile for suppressing extraneous light. The extraneous light wavelength to be suppressed can be in the IR wavelength range, for example in the range of between 10 μm and 11 μm. The extraneous light wavelength to be suppressed can also be in a wavelength range adjacent to the used light wavelength of the illumination light, in particular in the EUV or very ultraviolet (VUV) wavelength range, i.e. in the waveband of between 5 nm and 200 nm, omitting the used light wavelength, or else in the range of between 100 nm and 200 nm.

An embodiment of the diffraction structures according to Claim 11 is especially adapted to the requirements made of an LPP source (laser produced plasma), in the case of which, firstly, an extraneous light wavelength range around a laser pump light wavelength and, secondly, a further extraneous light wavelength range around the used light wavelength of the illumination light, omitting exactly this used light wavelength, can then be suppressed.

The optical element can be in particular a multiband grating designed for diffracting different wavelength ranges, in particular firstly in the VUV and secondly in the IR.

Within the respective extraneous light wavelength range, a plurality of discrete extraneous light wavelengths can be suppressed, for example differing pulse and main pulse wavelengths in the case of an LPP radiation source or else different EUV and VUV extraneous light wavelengths produced by the plasma.

The advantages of an illumination system according to Claim 12, a projection exposure apparatus according to Claim 13, a production method according to Claim 14 and a component according to Claim 15 correspond to those which have already been explained above with reference to the production method and to the optical element produced. The component produced can be a microchip, in particular a memory chip.

BRIEF DESCRIPTION OF THE DRAWINGS

Exemplary embodiments of the invention are described in greater detail below with reference to the drawing, in which:

FIG. 3 shows a structurable layer coated with photoresist, FIG. 4 shows the structurable layer after development of the photoresist, FIG. 5 shows the finished structurable layer after a further photoresist coating step, and FIG. 6 shows the structurable layer after development of the further photoresist, resulting in a 3-level diffraction structure;

DETAILED DESCRIPTION

Firstly, the general construction of a microlithographic projection exposure apparatus 1 will be described.

Figure 1:
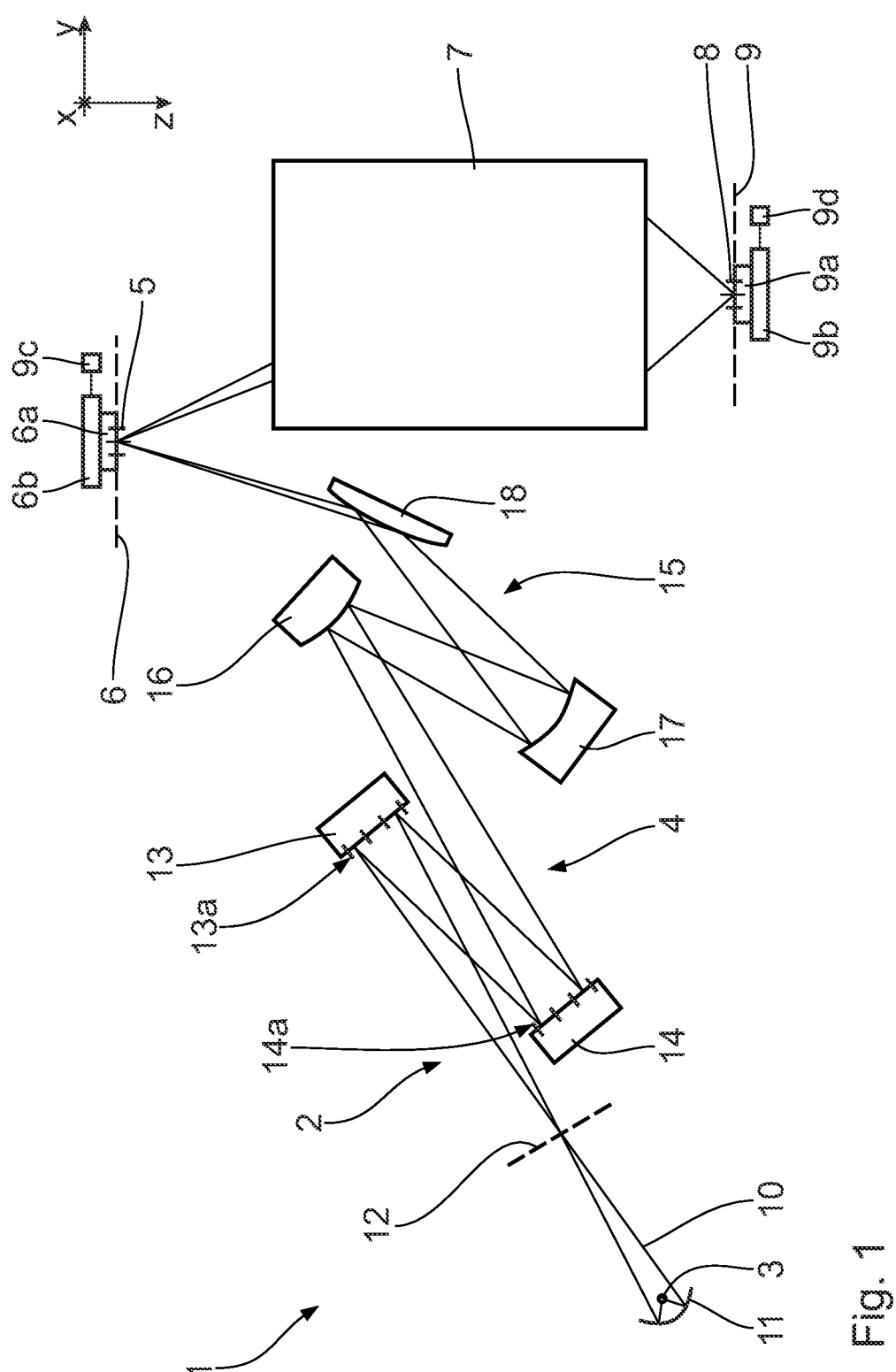
FIG. 1 schematically shows a meridional section of a projection exposure apparatus for EUV projection lithography.

A Cartesian xyz-coordinate system is used for description purposes. In FIG. 1, the x-axis extends perpendicularly to the plane of the drawing into the latter. The y-axis extends towards the right. The z-axis extends downward. In association with the description of individual components, in FIG. 2 et seq. a local Cartesian xyz-coordinate system is used which is arranged such that the x-axis of the local coordinate system extends parallel to the x-axis of the global coordinate system according to FIG. 1 and the x- and y-axes in each case span a principal plane approximated to a respective optical surface.

FIG. 1 schematically shows a microlithographic projection exposure apparatus 1 in a meridional section. An illumination system 2 of the projection exposure apparatus 1 has, besides a radiation source 3, an illumination optical unit 4 for the exposure of an object field 5 in an object plane 6. In this case, a reticle 6a arranged in the object field 5 is exposed, this reticle being held by a reticle holder 6b. A projection optical unit 7 serves for imaging the object field 5 into an image field 8 in an image plane 9. A structure on the reticle is imaged onto a light-sensitive layer of a wafer 9a arranged in the region of the image field 8 in the image plane 9, this wafer being held by a wafer holder 9b.

The reticle holder 6b is driven by a reticle displacement drive 9c and the wafer holder 9b is driven by a wafer displacement drive 9d. The two displacement drives 9c, 9d are driven in a manner synchronized with one another along the y-direction.

The radiation source 3 is an EUV radiation source having an emitted used radiation in the range of between 5 nm and 30 nm. This can be a plasma source, for example a GDPP (gas discharge-produced plasma) source or an LPP (laser-produced plasma) source. By way of example, tin can be excited to form a plasma with a carbon dioxide laser operating at a wavelength of 10.6 that is to say in the infrared range. A radiation source based on a synchrotron can also be used for the radiation source 3. Information about such a radiation source can be found by the person skilled in the art for example in U.S. Pat. No. 6,859,515 B2. EUV radiation 10 emerging from the radiation source 3 is focused by a collector 11. The basic construction of a corresponding collector is known, e.g., from U.S. Pat. No. 9,541,685 B2. Downstream of the collector 11, the EUV radiation 10 propagates through an intermediate focal plane 12 before being incident on a field facet mirror 13 with a multiplicity of field facets 13a. The field facet mirror 13 is disposed in a plane of the illumination optical unit 4 which is optically conjugate with respect to the object plane 6.

The EUV radiation 10 is also referred to hereinafter as illumination light or as imaging light.

Downstream of the field facet mirror 13, the EUV radiation 10 is reflected by a pupil facet mirror 14 with a multiplicity of pupil facets 14a. The pupil facet mirror 14 is arranged in a pupil plane of the illumination optical unit 4, which is optically conjugate with respect to a pupil plane of the projection optical unit 7. With the aid of the pupil facet mirror 14 and an imaging optical assembly in the form of a transfer optical unit 15 having mirrors 16, 17 and 18 designated in the order of the beam path, the field facets 13a of the field facet mirror 13 are imaged into the object field 5 in a manner being superimposed on one another. The last mirror 18 of the transfer optical unit 15 is a grazing incidence mirror (GI mirror).

Figure 2:
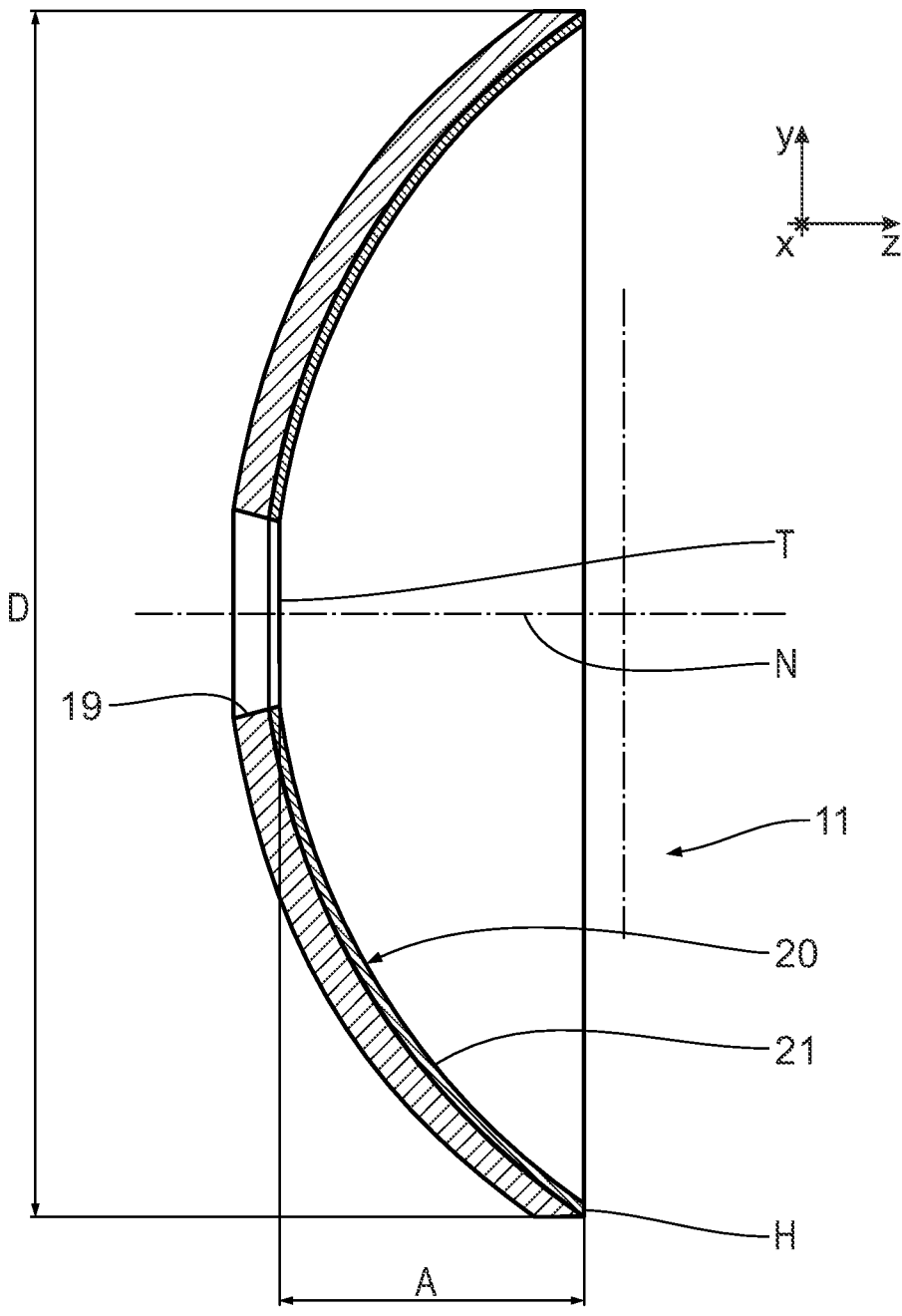
FIG. 2 shows a meridional section through a collector of the projection exposure apparatus.

FIG. 2 shows the collector 11 in greater detail. This collector, insofar as the radiation source 3 is embodied as an LPP source, has a through opening 19 for pump light for producing the plasma. The pump light can have a pump light wavelength in the infrared wavelength range, for example of 10.6 μm.

The collector 11 is one example of an optical element produced according to a method which is described in even greater detail below.

Figure 6:
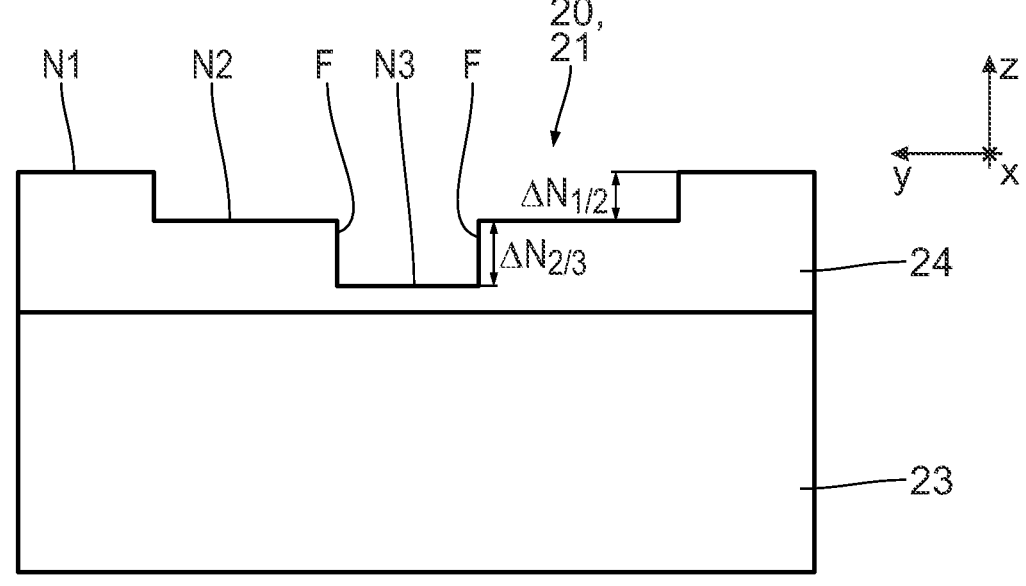
Figure 7:
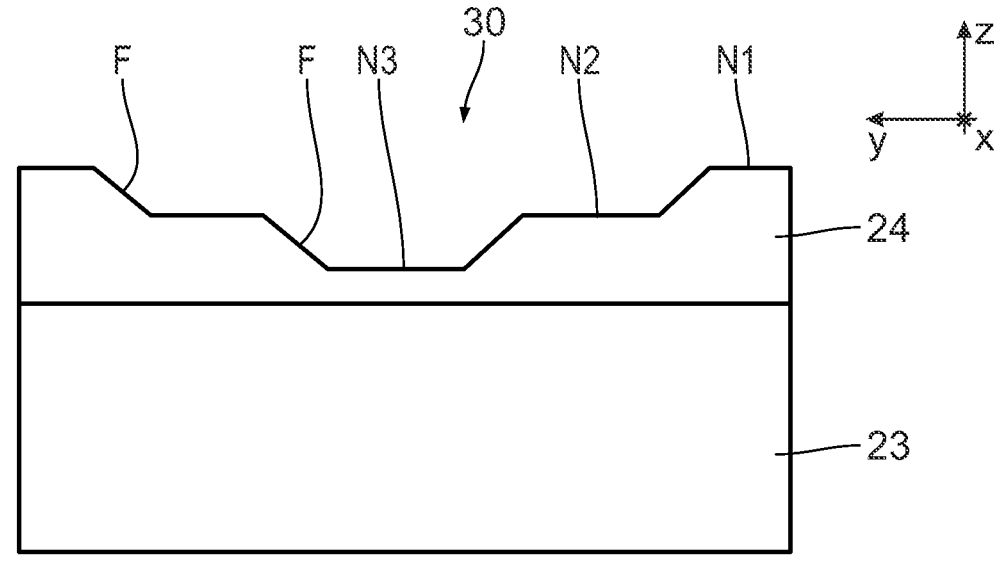
FIG. 7 shows, in an illustration similar to FIG. 6, which shows a produced 3-level diffraction structure with structures having 90° sidewall steepness, a 3-level diffraction structure with sidewalls having 45° sidewall steepness as a further embodiment of a produced optical element having diffraction structures.

The collector 11 has an optical surface 20 having a diffraction structure 21, portions of which as the result of the production method are illustrated as examples in FIGS. 6 and 7. The diffraction structure 21 serves for suppressing extraneous light wavelengths that differ from the used illumination light wavelength of the illumination light 10 for which collector reflection the collector 11 is designed. The extraneous light wavelengths to be suppressed can be, firstly, the IR wavelength of the pump laser and, secondly, EUV or VUV wavelengths additionally produced by the produced plasma besides the used light wavelength in the range of less than a used light wavelength of 13 nm, for example, and in a range of from greater than the used light wavelength to a range of 250 nm, for example. The diffraction structure 21 can be designed in particular such that it suppresses two mutually different extraneous light wavelength ranges, for example firstly an IR wavelength range and secondly a VUV wavelength range.

The optical surface 20 of the collector 11 is concavely curved. An averaged surface normal N of the optical surface 20 extends on an axis of rotation of symmetry of the optical surface 20. The surface normal N extends parallel to the z-axis of the local xyz-coordinate system of the collector 11. Measured along this averaged surface normal N, there is a distance A between a deepest point T of the optical surface 20 and a highest point H on an edge of the optical surface 20. As viewed from the z-direction, the optical surface 20 of the collector 11 is round and has a diameter D. A distance-to-diameter ratio A/D is a measure of a curvature of the optical surface 20 of the collector 11. This ratio A/D is approximately 1/4 in the case of the collector 11. Depending on the embodiment of the optical element having the diffraction structures to be produced, the collector 11 being one example of such optical element, the ratio A/D is in the range of between 1/10 and 1/1.

The diameter D of the optical surface 20 is greater than 100 mm and, in the exemplary embodiment illustrated, is approximately 150 mm. Depending on the embodiment of the optical element, the collector 11 being one example thereof, a largest diameter of the optical surface 20 can be in the range of between 100 mm and 10 m.

Figure 3:
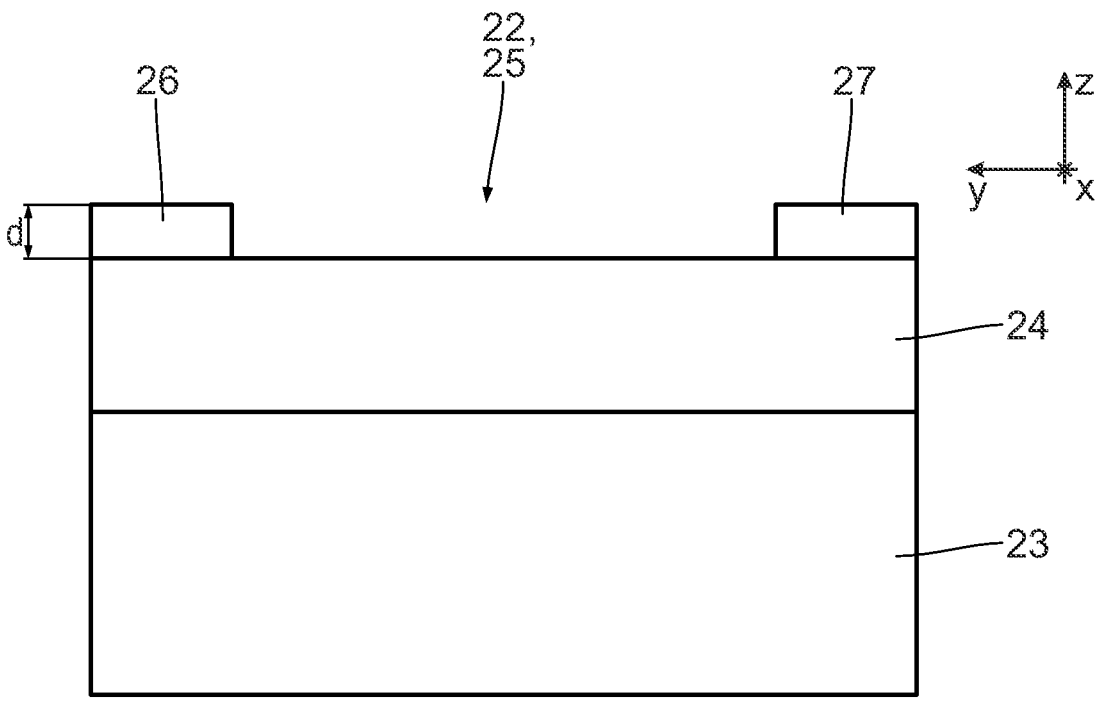
FIGS. 3 to 6 show snapshots in the form of meridional sections through a portion of a (raw) optical surface of the collector during the production thereof, wherein, in particular

A method for producing the collector 11 with the optical surface 20 having the diffraction structure 21 is described below with reference to FIGS. 3 to 6. FIG. 3 shows a snapshot of the production method. It shows, in a very greatly enlarged view, a portion of a raw optical surface 22, which becomes the optical surface 20 in the course of the production method. A basic body 23 of the raw optical surface 22 bears a structurable layer 24, in which the diffraction structure is introduced.

The raw optical element 25 having the raw optical surface 22 has a raw distance-to-diameter ratio which deviates from the distance-to-diameter ratio A/D of the finished collector 11 by not more than 10%. The raw optical surface 22 thus has a curvature corresponding to that of the finished optical element 11.

In the snapshot illustration shown in FIG. 3, the structurable layer 24 is coated with portions 26, 27 of a photoresist in a structured manner. This coating is effected with the aid of an isotropic deposition method. As isotropic deposition methods for the coating of the raw optical element 25 with photoresist, firstly the method of electrophoretic deposition and secondly the method of molecular layer deposition are alternatively available.

During electrophoretic deposition (EPD), colloidal particles are deposited on an electrode, namely the raw optical surface 22, under the influence of an electric field. The deposition method is conformal, such that the photoresist portions 26, 27 exactly reproduce the shape of the structurable layer 24 in the applied portions. The portions 26, 27 of the photoresist are applied with a thickness d which is in the range of between 5 μm and 20 μm, for example 6 μm, 8 μm or 10 μm. A thickness variation of the thickness d over the xy-footprint of the raw optical surface 22 is less than 2 μm and is in particular less than 1 μm, less than 0.5 μm and can attain a value of 0.4 μm. By way of example, the thickness of the applied photoresist portions 26, 27 fluctuates by not more than 0.4 μm over the entire raw optical surface 22 of the collector 11 and can be between 7.8 μm and 8.2 μm, for example.

An aqueous suspension can be used as EPD photoresist, in which suspension a solid is referred to as micelles. These micelles can consist of an acrylic copolymer shell, these being stabilised by surface charges of ionizable amino groups. Details concerning electrophoretic deposition can be found by a person skilled in the art, for example, in U.S. Pat. No. 3,738,835, DE 10 258 094 A1 and EP 0 176 356 B1.

The photoresist portions 26, 27 are deposited in a deposition cell A potential is applied to the conductive workpiece, i.e. the raw optical element 25, the polarity of which potential attracts the charged cells of the photoresist, these cells coagulating on the structurable layer 24 to form a uniform film. The layer thickness d of the photoresist portions 26, 27 and a distribution of the portions 26, 27 can be dependent on, and correspondingly controlled by way of, an applied deposition voltage, a deposition temperature and a deposition residence time.

Figure 4:
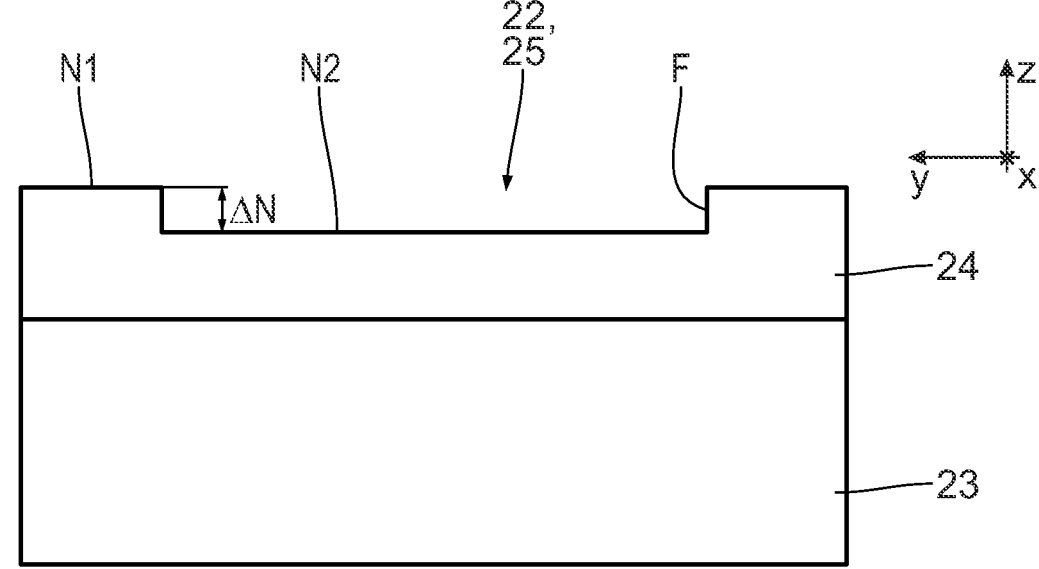

FIG. 4 shows the situation after development of the photoresist, i.e. after etching and removal of the photoresist portions 26, 27. Two levels have now been formed in the structurable layer 24, namely a higher level N1 where the photoresist portions 26, 27 were present, and a deeper level N2 where the structurable layer was uncovered, i.e. was not coated with photoresist. A sidewall steepness of structure sidewalls F between the higher level N1 and the deeper level N2 is 90° to a good approximation. The sidewalls F are thus perpendicular to the surfaces of, firstly, the higher level N1 and, secondly, the deeper level N2.

Figure 8:
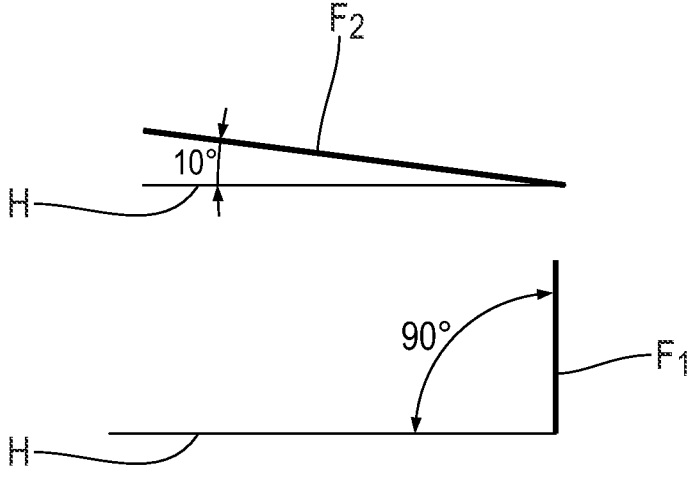
FIG. 8 schematically shows two sidewall portions of a diffraction structure for explaining a definition of the parameter "sidewall steepness"

FIG. 8 illustrates the definition of the parameter "sidewall steepness in degrees". Two sidewalls $F_1$ und $F_2$ of a diffraction structure are illustrated by way of example. The sidewall $F_1$ having a sidewall steepness of 90° forms an angle of 90° with a horizontal H (corresponding to the xy-plane in FIGS. 3 to 7). The sidewall $F_2$ having a sidewall steepness of 10° forms an angle in the region of 10° with the horizontal H.

Figure 5:
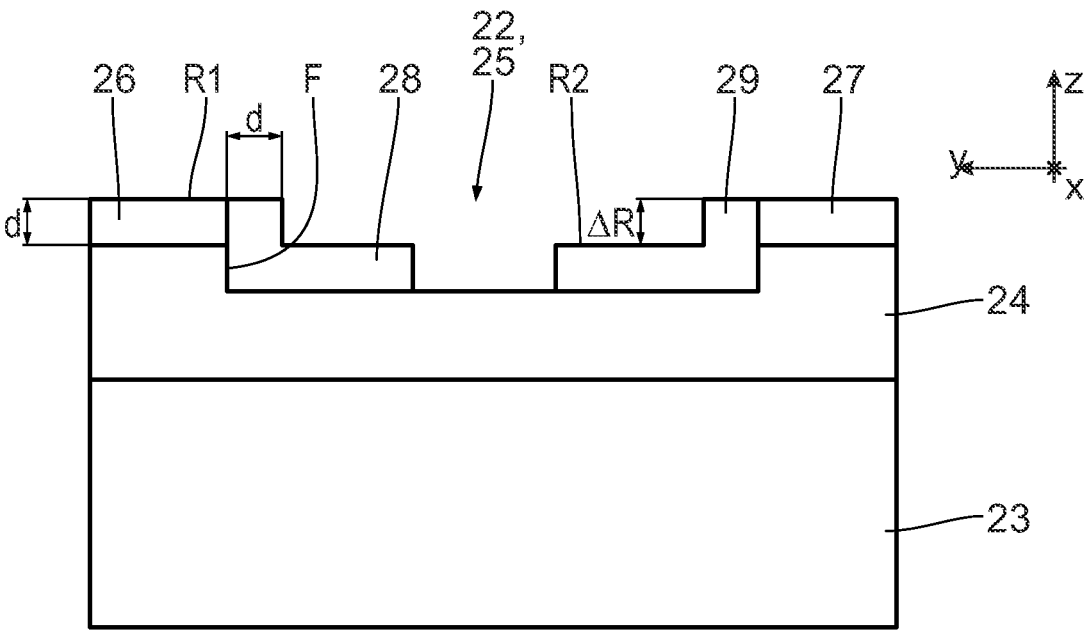

FIG. 5 shows the situation after a further, second coating step, in which the structurable layer 24 of the raw optical surface 22 was coated once more with portions 28, 29 of a photoresist. On account of the coating with the aid of electrophoretic deposition, the shapes of the photoresist portions 28, 29 exactly follow the already introduced structure in the structurable layer 24. Accordingly, the photoresist portions 26, 27 exhibit two resist levels R1 (higher level) and R2 (deeper level), the level difference ΔR between which is exactly equal to the level difference ΔN between the levels N1 and N2 of the structurable layer 24 during the production step according to FIG. 4.

In the region of the sidewalls F of the structurable layer 24, too, the photoresist is present with a thickness d, measured in the y-direction, after the coating step according to FIG. 5. The sidewalls F of the structurable layer 24 are thus definitely covered with the photoresist where this is desired.

FIG. 6 shows the optical surface 20 finished with regard to the diffraction structure to be produced, after the development of the raw optical surface 22 with the photoresist portions 28, 29. The diffraction structure is embodied as a ternary structure having three levels N1, N2 and N3.

The deepest level N3 is where there was an interspace between the photoresist portions 28, 29 and the structurable layer 24 was thus free for the etching process. The sidewalls F between the levels N2 and N3 also have a sidewall steepness which is 90° to a good approximation.

With ternary structures in accordance with the diffraction structure 20, the desired extraneous light suppression can be achieved depending on the configuration of the level differences $ΔN_{1/2}$, $ΔN_{2/3}$ and depending on the extent of the levels N1, N2 and N3 in the xy-plane.

In the case of the alternative method of molecular layer deposition, the photoresist portions 26, 27, firstly, and 28, 29, secondly, are deposited by way of molecular layer deposition rather than, as explained above, by way of electrophoretic deposition. Such a method is described in US 2012/0121932 A1, for example. The photoresist is deposited with two or more self-limiting surface reactions carried out cyclically. Molecular fragments are deposited in the process. Photoresist systems which form molecular glasses and consist of a plurality of components can be used as photoresists. One of these components, a photoacid (photoacid generator, PAG), releases an acid as a result of irradiation at a suitable wavelength in a plurality of steps, which acid catalytically triggers a reaction between the other components of the photoresist system upon brief heating of the system (post-exposure bake, PEB). This process is referred to as chemical amplification since a multiplicity of component reactions are initiated by an irradiation photon.

Alternatively, a photoresist system based on coumarin derivatives which react with themselves can be used as photoresist, which derivatives are subject to a [2+2] cyc-loaddition upon UV exposure with a wavelength of greater than 300 nm. As a result, depending on the number of functional groups, molecular dimers, molecular chains or else molecular networks can arise in the molecule of the photoresist system. Use is preferably made of 1,3-dibenzyl-5-tert-butylcoumarin esters and 3,5-di-tert-butylbenzylcou-marin esters, which form transparent, amorphous films. After an exposure, the monomers in unexposed regions can be evaporated in a high-vacuum apparatus, the resulting outcome being the properties of a photoresist, although in the context of "dry" photolithography.

After the photoresist portions have been removed, the diffraction structure 21 produced can be provided with a sealing layer or protective layer. This can be done by way of atomic layer deposition (ALD), which is known for example from U.S. Pat. No. 9,640,291 B2 and US 2016/0086681 A1. In particular, a molybdenum-silicon double-ply structure can serve as the protective layer. Details of such a layer stack are known from the prior art.

The method steps "development of the photoresist" and "removal of photoresist residues" are known from U.S. Pat. No. 6,352,747 B1.

FIG. 7 shows, in an illustration similar to FIG. 6, a further embodiment of a diffraction structure 30, which can be produced instead of the diffraction structure 21, or instead of the diffraction structures that will also be described below, during the production of the optical element, i.e. in particular the collector 11. Components and functions corresponding to those which have already been explained above with reference to the embodiment according to FIGS. 2 to 6, and in particular according to FIGS. 3 to 6, bear the same reference signs and will not be discussed in detail again.

The diffraction structure 30 also has three structure levels N1, N2 and N3 Sidewalls F between the levels N1 and N2, firstly, and N2 and N3, secondly, have a sidewall steepness which is in the range of 40° or 45°.

Diffraction structures having sidewalls F having a side-wall steepness in particular in the range of between 10° and 80°, and for example in the range of between 30° and 60°, can be produced with the aid of greyscale lithography, in particular. Information concerning corresponding produc-tion techniques for sidewalls F having such sidewall steep-nesses can be found by a person skilled in the art in the specialist articles by A. Grushina, Advanced Optics Techn. 2019; 8 (3 to 4): 163-169, by T. Weichelt et al., Optics Express, Volume 25, No. 18, 20983 to 20992, 2017, by T. Weichelt et al., Journal of Optics 18 (2016) 125401, by C. Stilson et al., Proceedings of SPIE 8973: Micromachining and Microfabrication Process Technology XIX, No. 8973 (March 2014), by K. Reimer et al., Proceeding SPIE Vol. 3008, pp. 279 to 288, 1997, by T. J. Suleski, Applied Optics, Volume 34, No. 32, 7507 to 7517, 1995 and by D. C. O'Shea et al., Applied Optics, Volume 34, No. 32, 7518 to 7526, 1995, and the references indicated therein.

Blazed diffraction structures can be produced, in particu-lar, by predefining the sidewall steepness.

Figure 9:
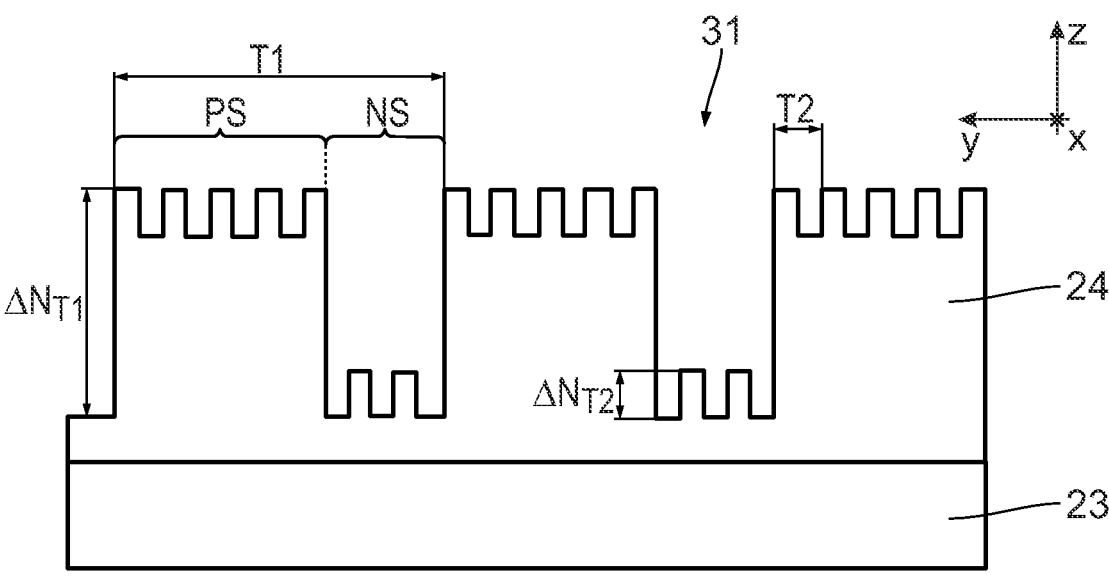
FIG. 9 shows, in an illustration similar to FIGS. 6 and 7, a further embodiment of a produced optical element having diffraction structures in the form of a multi-periodic grating.
Figure 10:
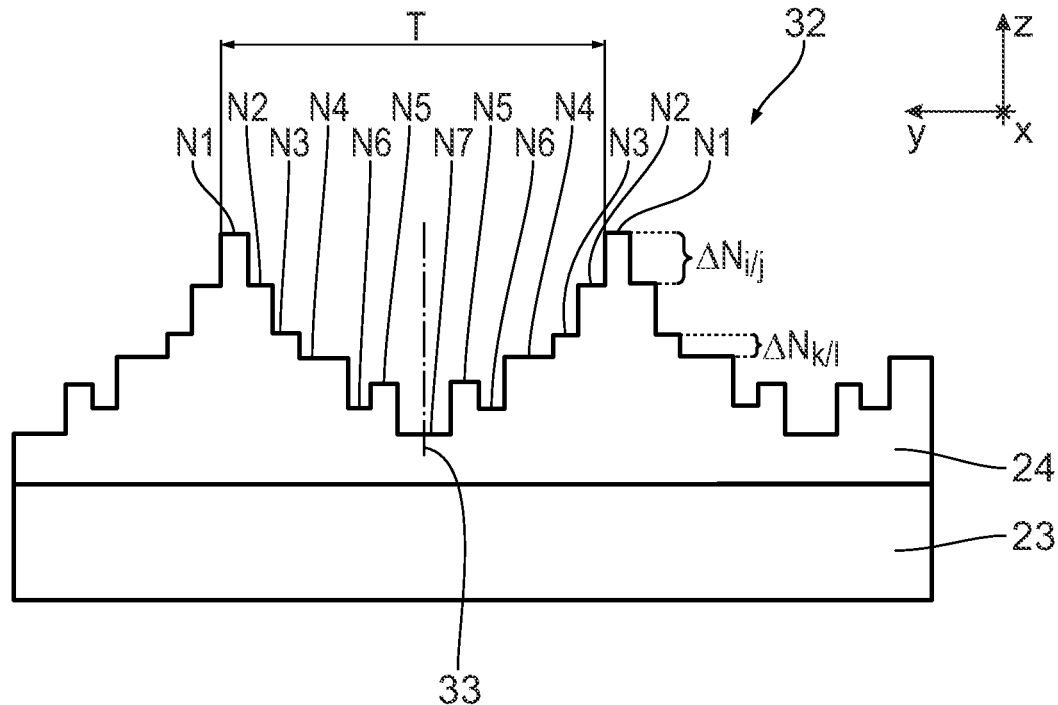
FIG. 10 shows, in an illustration similar to FIGS. 6, 7 and 9, a further embodiment of a produced optical element having diffraction structures in the form of a multiply stepped grating having a multiplicity of levels and a plurality of level differences.

With reference to FIGS. 9 and 10, a description is given below of two further embodiments of diffraction structures 31, 32, or optical gratings, which can be produced instead of the above-explained diffraction structures during the pro-duction of the optical element, i.e. in particular the collector 11. Components and functions corresponding to those which have already been explained above with reference to the embodiments according to FIGS. 2 to 8, and in particular according to FIGS. 6 and 7, bear the same reference signs and will not be discussed in detail again.

The diffraction structure 31 according to FIG. 9 is embod-ied as a multi-periodic diffraction grating having periods T1 and T2. The following holds true: T1=7T2, where the ratio T1/T2 can be for example in the range of between 1.1:1 and 100:1 and can also be outside this range. The period T2 is thus present a total of seven times within the period T1, a positive structure PS of the period T1 extending over a total of 4.5 grating periods T2 and a negative structure NS of the grating period T1 extending over the remaining 2.5 grating periods T2. A duty cycle of the grating having the period T1 is thus 9/5. A level difference $\Delta N_{T1}$ of the grating having the period T1 is approximately five times the magnitude of a level difference $\Delta N_{T2}$ of the grating having the period T2.

A duty cycle of the grating having the period T2 is thus 1:1. There the respective positive structure thus has, in the grating extension direction extending along the y-direction, the same extent as one of the negative structures of the grating having the period T2.

An extraneous light suppression characteristic of the diffraction structure 31 can be finely predefined by way of the grating periods T1, T2, by way of the level differences $\Delta N_{T1}$, $\Delta N_{T2}$ and also by way of the duty cycles of the two gratings of the grating periods T1, T2.

The diffraction structure 32 according to FIG. 10 is embodied as a multiply stepped diffraction grating having a grating period T. Overall, the diffraction structure 32 has seven different diffraction levels N1 to N7 within one period, a structure height of a level Ni+1 in each case being smaller than that of the level Ni. The sequence of these structure levels within the period T is N1, N2, N3, N4, N6, N5, N7, N5, N6, N4, N3 and N2. Other numbers of structure levels and other sequences are also possible depending on the embodiment of the multi-periodic grating of the diffraction structure 32.

In addition, the diffraction structure 32 has two different level differences $\Delta N_{i/j}$ and $\Delta N_{k/l}$. The larger level difference $\Delta N_{i/j}$, which is present between the levels N1/N2, N2/N3, N4/N6 and N5/N7 in the exemplary embodiment in FIG. 10, is approximately double the magnitude of the level differ-ence $\Delta N_{k/l}$ present between the levels N3/N4, N6/N5.

Around the deepest level N7, the level arrangement of the diffraction structure 32 is mirror-symmetrical about a plane 33 parallel to the xz-plane.

Extraneous light suppression parameters of the diffraction structure 32 can be finely predefined by way of the relative structure heights of the levels N1 to N7, the structure height sequence of the levels N1 to N7 and also by way of the level differences $\Delta N_{i/j}$ and $\Delta N_{k/l}$ Other numbers of absolute level differences and some other number of different level differences are also possible depending on the embodiment of the diffraction structure 32.

With the aid of the projection exposure apparatus 1, at least one part of the reticle in the object field 5 is imaged onto a region of a light-sensitive layer on the wafer in the image field 8 for the lithographic production of a micro- or nanostructured component, in particular of a semiconductor component, for example of a microchip. In this case, the photoresist is exposed in structured fashion and is developed afterwards. Depending on the embodiment of the projection exposure apparatus 1 as a scanner or as a stepper, the reticle and the wafer are moved in a temporally synchronized manner in the y-direction continuously in scanner operation or step by step in stepper operation.

What is claimed is:

1. Method for producing an optical element with an optical surface having a diffraction structure, the optical surface being curved such that a distance-to-diameter ratio A/D between a distance A, measured along an averaged surface normal (N) of the optical surface, between a deepest point (T) and a highest point (H) on the optical surface and a largest diameter D of the optical surface is greater than 1/10, comprising the following steps to produce the optical element with the optical surface:

providing a raw optical element having a raw optical surface to be provided with the diffraction structure, coating the raw optical surface with a photoresist with an isotropic deposition method, structured exposing the photoresist, and developing the photoresist;

wherein the coating of the raw optical surface with the photoresist with the aid of the isotropic deposition method and the development of the photoresist is carried out repeatedly one after another during the production method.

2. Method according to claim 1, wherein, during said coating, the photoresist is applied with a thickness which ranges between 5 µm and 20 µm.

3. Method according to claim 1, wherein, during said coating, the photoresist is applied with a thickness variation of less than 20% of a maximum thickness of the applied photoresist.

4. Method according to claim 1, wherein said coating comprises an electrophoretic deposition.

5. Method according to claim 1, wherein said coating comprises a molecular layer deposition.

6. Optical element produced by the method according to claim 1, comprising the optical surface having the diffraction structure, wherein the optical surface is curved such that the distance-to-diameter ratio A/D between the distance A, measured along the averaged surface normal (N) of the optical surface, between the deepest point (T) and the highest point (H) on the optical surface and the largest diameter D of the optical surface is greater than 1/10.

7. Optical element according to claim 6, embodied as a collector configured for and arranged in a projection exposure apparatus for extreme ultraviolet (EUV) light.

8. Optical element according to claim 6, wherein the largest diameter of the optical surface is greater than 100 mm.

9. Optical element according to claim 6, wherein the diffraction structure comprises sidewalls each having a sidewall steepness which is greater than 10°.

10. Optical element according to claim 6, wherein the diffraction structure is configured such that when illumination light impinges on the optical element, at least one extraneous light wavelength which differs from an illumination light wavelength of the illumination light for which the optical element is configured is suppressed by diffraction.

11. Optical element according to claim 10, wherein the diffraction structure is configured such that when illumination light impinges on the optical element, two mutually different extraneous light wavelength ranges are suppressed.

12. Optical element according to claim 10, wherein the at least one extraneous light wavelength comprises an IR wavelength, an EUV wavelength or a VUV wavelength that differs from the illumination light wavelength.

13. Illumination system comprising an optical element according to claim 6 and comprising an EUV radiation source.

14. Projection exposure apparatus for EUV projection lithography comprising an illumination system according to claim 13 and further comprising:

an illumination optical unit configured to transfer the illumination light from the radiation source into an object field, in which a reticle with structures to be imaged is arranged, and a projection optical unit for imaging the object field into an image field.

15. Method for producing a micro- or nanostructured component, comprising:

providing a substrate, to which a layer composed of a light-sensitive material is at least partly applied, providing a reticle having structures to be imaged, projecting at least one part of the reticle onto a region of the light-sensitive layer of the substrate with the projection exposure apparatus according to claim 14.

16. Component, produced by a method according to claim 15.

17. Optical element according to claim 6, the diffraction structure is configured such that when illumination light impinges on the optical element, at least two extraneous light wavelengths which differ from an illumination light wavelength of the illumination light for which the optical element is configured is suppressed by diffraction.

18. Optical element according to claim 17, wherein a first of the at least two extraneous light wavelengths comprises an IR wavelength.

19. Optical element according to claim 18, wherein a second of the at least two extraneous light wavelengths comprises a VUV wavelength.

20. Optical element according to claim 18, wherein a second of the at least two extraneous light wavelengths comprises an EUV wavelength.

* * * * *